United States Patent
Konsow (10) Patent No.: US 12,325,920 B1
(45) Date of Patent: Jun. 10, 2025

(54) METHOD AND SYSTEM FOR DEPOSITING THIN FILM ON SUBSTRATE

(71) Applicant: IMAM MOHAMMAD IBN SAUD ISLAMIC UNIVERSITY, Riyadh (SA)

(72) Inventor: Mohamed Abdel Rafea Ibrahim Konsow, Riyadh (SA)

(73) Assignee: IMAM MOHAMMAD IBN SAUD ISLAMIC UNIVERSITY, Riyadh (SA)

(*) Notice: Subject to any disclaimer, the term of this patent is extended or adjusted under 35 U.S.C. 154(b) by 0 days.

(21) Appl. No.: 18/633,071

(22) Filed: Apr. 11, 2024

(51) Int. Cl.
*C23C 18/12* (2006.01)
*C03C 17/00* (2006.01)
*C03C 17/25* (2006.01)

(52) U.S. Cl.
CPC ........ *C23C 18/1291* (2013.01); *C03C 17/006* (2013.01); *C03C 17/25* (2013.01); *C23C 18/1216* (2013.01); *C23C 18/1225* (2013.01); *C23C 18/1241* (2013.01); *C23C 18/1245* (2013.01); *C03C 2217/732* (2013.01); *C03C 2218/111* (2013.01); *C03C 2218/32* (2013.01)

(58) Field of Classification Search
CPC ............ C23C 18/1291; C23C 18/1216; C23C 18/1225; C23C 18/1241; C23C 18/1245; C03C 17/006; C03C 17/25; C03C 2217/732; C03C 2118/111; C03C 2118/32
See application file for complete search history.

(56) References Cited

U.S. PATENT DOCUMENTS

| | | | | |
|---|---|---|---|---|
| 2001/0010950 A1* | 8/2001 | Savage | ............. | H01L 21/67178 438/124 |
| 2009/0293942 A1* | 12/2009 | Harimoto | ............ | C23C 18/1275 428/428 |
| 2011/0011460 A1* | 1/2011 | Munteanu | ............. | H10F 10/167 136/265 |

FOREIGN PATENT DOCUMENTS

| CA | 2546825 A1 * | 11/2007 | ............... F24J 2/202 |
|---|---|---|---|
| CN | 101037509 A * | 9/2007 | |

(Continued)

OTHER PUBLICATIONS

Rafea et al ("The effect of annealing on the structure, morphology, and optical properties of Co3O4 thin films prepared using a modified dip coating technique." Materials Science & Eng B 290 (2023) 116294 pp. 1-8 Available online Feb. 1, 2023 (Year: 2023).*

(Continued)

*Primary Examiner* — Nathan H Empie
(74) *Attorney, Agent, or Firm* — Oblon, McClelland, Maier & Neustadt, L.L.P.

(57) ABSTRACT

A method and a system for depositing a thin film with a thickness under 10 μm. The method includes submerging a substrate in a precursor liquid in a deposition vessel having an inlet pipe and outlet pipe and a substrate holder that suspends the substrate inside the deposition vessel at an immersion depth. The outlet pipe is situated at a first height lower than the immersion depth, while the inlet pipe is connected above it, allowing for controlled filling and draining, managed by a drain valve. The excess precursor liquid is discharged from the substrate by gravity to a collection vessel, creating a uniform layer. This layer is then dried in a drying chamber, after which one side of the substrate is cleared to leave a single film which is then heated providing thin film formation.

10 Claims, 6 Drawing Sheets

(56) References Cited

FOREIGN PATENT DOCUMENTS

| IN | 1111/DEL/2015 | 7/2017 |
| JP | 2009-62231 | 3/2009 |
| WO | 92/03232 | 3/1992 |

OTHER PUBLICATIONS

Barrera et al ( Spectroscopic Ellipsometry Study of Co3O4 Thin Films Deposited on Several Metal Substrates; The Open surface Science Journal, 2013, vol. 5, p. 9-16 (Year: 2013).*
Webcature from Internet archive from Oct. 30, 2024 https://www.marlinwire.com/blog/what-grades-of-stainless-steel-resist-oxidation-at-what-temperatures (Year: 2013).*
Yamny et al "Preparation and Characterization of ZnO:In Transparent Conductor by Low Cost Dip Coating Technique" Journal of Modern Physics, 2012, 3, 1060-1069 (Year: 2012).*
Rahmani ; Thin Films—Growth, Characterization and Electrochemical Applications ; Preparation and Characterization of Thin Films by Sol-Gel Method ; Nov. 25, 2023 ; 16 Pages.

\* cited by examiner

METHOD AND SYSTEM FOR DEPOSITING THIN FILM ON SUBSTRATE

BACKGROUND

Technical Field

The present disclosure relates to the field of thin film coating deposition techniques, particularly a low-cost deposition technology for antireflecting coatings and absorbers for solar radiation absorption.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Cobalt oxide ($Co_3O_4$) is considered as well-known solar absorber due to its superior solar absorption capabilities, attributed to its multi-transition process across a broad solar spectrum. The specification of the $Co_3O_4$, in comparison with the black body radiation, provide low emissivity (about 5%) and high absorptivity (about 95%) making it suitable candidate for solar absorber applications. However, a significant challenge associated with $Co_3O_4$ is its high reflectance, which falls within the 20-30% range across a wide spectrum. This high reflectance limits its effectiveness as a solar absorber, as a considerable portion of incident solar radiation is reflected away, undermining its inherent absorptive properties.

Thin film deposition technologies are widely implemented for enhancing the efficiency of solar absorbers. The deposition of thin films on substrates helps in improving the optical properties of solar collectors, primarily by increasing their ability to absorb solar radiation while minimizing reflectance. Various deposition techniques have been developed to produce thin films that can significantly enhance the performance of solar energy systems. However, the deposition of $Co_3O_4$ coatings, while feasible through advanced techniques like sputtering, often necessitates small-scale operations to maintain quality, restricting the potential for broader application. Additionally, the inherent reflection issue associated with $Co_3O_4$ coatings reduces the overall efficiency of solar absorbers, necessitating solutions to mitigate this drawback.

Conventional solutions to address this issue have drawn inspiration from high-efficiency solar cells, where antireflecting coatings are employed to minimize reflection. Although these approaches have shown promise both experimentally and theoretically, they typically require materials that can withstand high temperatures, which is not always desirable in solar applications where lower operational temperatures are preferred. Further, the traditional coating techniques, while effective to a degree, often result in films with inadequate adherence and quality, impacting the durability and efficiency of the solar absorbers. Moreover, the scalability of these methods for wide-area coating applications remains a challenge, limiting their practicality for large-scale solar energy projects.

Accordingly, it is one object of the present disclosure to provide a solution that can overcome the challenges associated with existing deposition techniques. Such a solution should provide an efficient and a cost-effective method for the deposition of solar absorber coatings. Such a solution should also address the high reflectance issue, leveraging the strengths of $Co_3O_4$ while overcoming its primary limitations, as well as offer scalability for application across wide areas and on various substrate types to meet the growing demands of modern solar energy applications.

SUMMARY

In an aspect, a method for depositing a thin film having a film thickness less than 10 μm on a substrate having a first side and a second side is described. The method comprises submerging the substrate in a precursor liquid by filling a deposition vessel with an amount of the precursor liquid. The deposition vessel has an inlet pipe, an outlet pipe, a drain valve, and a substrate holder configured to suspend the substrate inside the deposition vessel at an immersion depth. The outlet pipe is fluidly connected to the deposition vessel at a first height lower than the immersion depth and the inlet pipe is fluidly connected to the deposition vessel at a second height greater than the outlet pipe. The drain valve is in line with the outlet pipe. The deposition vessel is filled with the precursor liquid through the inlet pipe. The method further comprises draining the precursor liquid by gravity at a controlled flow rate to a collection vessel via the outlet pipe downstream from the drain valve. The collection vessel is configured to receive and contain the precursor liquid from the deposition vessel. A top of the collection vessel is below the outlet pipe of the deposition vessel. The inlet pipe, the outlet pipe, the deposition vessel, and the collection vessel are in fluid communication. The method further comprises after the draining, discharging, by gravity, an excess amount of the precursor liquid from the substrate in a precursor vapor atmosphere in the deposition vessel to form a homogenous precursor deposition layer on the first and second sides of the substrate. The method further comprises drying the homogenous precursor deposition layer in a drying chamber to form a precursor film on the first and second sides of the substrate. The method further comprises removing the precursor film from one of the first side or the second side of the substrate to form a substrate having a single film. The method further comprises decomposing the single film on the substrate at a decomposition temperature to form the thin film on the substrate.

In some embodiments, the immersing, draining, discharging, drying, removing and decomposing are repeated cyclically for two or more cycles to deposit a plurality of thin film layers and thereby increase the film thickness of the thin film.

In some embodiments, the substrate is a solar collector, and wherein the thin film is a solar absorber.

In some embodiments, the solar absorber comprises $Co_3O_4$/CuO.

In some embodiments, the plurality of thin film layers includes 2-16 layers.

In some embodiments, the plurality of thin film layers includes 6 layers.

In some embodiments, a surface temperature of the second side of the substrate having the plurality of thin films under a direct solar radiation is greater than 50° C. without a back insulation.

In some embodiments, a width of the substrate is 150 mm-250 mm and a height of the substrate is 150 mm-250 mm.

In some embodiments, the substrate comprises a glass, and the decomposition temperature of the precursor film is less than a glass transition temperature of the substrate.

In some embodiments, the substrate comprises a metal, and the decomposition temperature of the precursor film is less than a thermal oxidation temperature of the substrate.

In another aspect, a system for depositing a thin film having a film thickness less than 10 μm on a substrate having a width, a height, a first side is described. The system comprises a deposition vessel having a substrate holder configured to suspend the substrate inside the deposition vessel at an immersion depth. The system further comprises an outlet pipe having a drain valve in line with the outlet pipe. The outlet pipe is fluidly connected to the deposition vessel at a first height lower than the immersion depth. The system further comprises an inlet pipe fluidly connected to the deposition vessel at a second height greater than the outlet pipe. The inlet pipe is configured to supply a precursor liquid in to fill the deposition vessel with an amount of the precursor liquid. The system further comprises a collection vessel configured to receive and contain the precursor liquid drained by gravity from the deposition vessel at a controlled flow rate via the outlet pipe and the drain valve. Atop of the collection vessel is below the bottom of the deposition vessel. The inlet pipe, the outlet pipe, the deposition vessel, and the collection vessel are in fluid communication. The system further comprises a drying chamber configured to dry the precursor deposited on the substrate and to remove the precursor from one of the first side or the second side of the substrate to form a substrate having a single film. The system further comprises a decomposition furnace configured to decompose the single film at a decomposition temperature to form the thin film on the substrate.

In some embodiments, the deposition vessel has a first size. The first size is determined based on the width and height of the substrate.

In some embodiments, the width of the substrate is 150 mm-250 mm and the height of the substrate is about 150 mm-250 mm.

In some embodiments, the collection vessel has a second size. The second size is determined based on the amount of the precursor liquid.

In some embodiments, the substrate is a solar collector, and the thin film is a solar absorber.

In some embodiments, the solar absorber comprises $Co_3O_4/CuO$.

In some embodiments, the thin film includes a plurality of thin film layers between 2 and 16 layers.

In some embodiments, the plurality of thin film layers includes 6 layers.

In some embodiments, a surface temperature of the second side of the substrate having the plurality of thin films under a direct solar radiation is greater than 50° C. without a back insulation.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a method and system for depositing thin films, particularly for solar radiation absorbers, using a modified immersion coating technique. This technique is characterized by its ability to deposit homogenous precursor layers on substrates, which are subsequently dried and decomposed to form thin films with a thickness of less than 10 μm. The process can be cyclically repeated to achieve the overall desired film thickness and optical properties, with particular emphasis on creating an efficient solar absorber composed of $Co_3O_4/CuO$ layers. The method and the system of the present disclosure address the need for a low-cost, scalable solution for producing solar absorbers with enhanced optical absorption and reduced solar reflectance.

Figure 1:
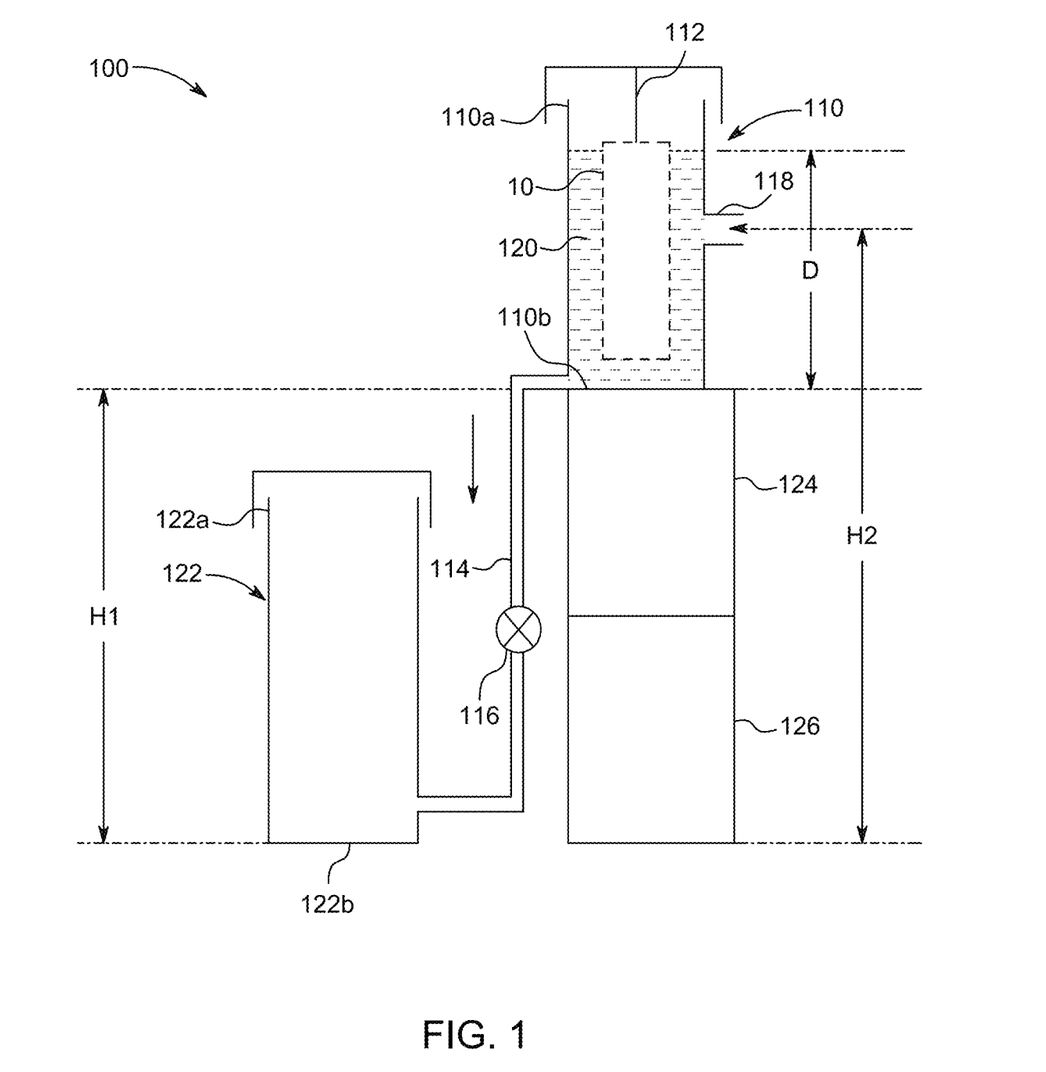
FIG. 1 is a diagrammatic illustration of a system for depositing a thin film coating, according to certain embodiments.

Referring to FIG. 1, illustrated is a diagrammatic illustration of a system (as represented by reference numeral 100) for depositing a thin film coating, in accordance with embodiments of the present disclosure. The system 100 is configured to implement a modified immersion or dip coating technique, which facilitates the application of a coating material onto a substrate (as represented by reference numeral 10). The substrate 10 may have a width, a height, a first side, and a second side (not labelled in the illustration). The system 100 operates to effectively deposit a thin film layer on the substrate 10 by providing a controlled environment where the coating material is applied. In the present embodiments, the system 100 is configured for depositing the thin film having a film thickness less than 10 μm. The architecture of system 100 is configured to operate in accordance with specific parameters to maintain the precision required for creating thin films with the film thickness of less than 10 μm. The system 100 utilizes the deposition process for enhanced uniformity and quality of the resultant thin film. The system 100 incorporates a fluid management approach that allows for the controlled flow of a solution through its components, ensuring that the substrate is evenly coated during the deposition phase. The process within the system 100 is adapted to provide uniform coverage of the substrate 10, resulting in a homogenous film that adheres to the specified thickness parameters described in the present disclosure. In some embodiments, the homogenous film refers to a film with a uniform thickness throughout the longitudinal axis of the film. In another embodiments, the thickness of the homogenous film is the specified thickness parameters outlined in the present disclosure ±5%, ±1%, ±0.1%, or ±0.01%. In yet another embodiments, the thickness difference between the thickest part and the thinnest part of the homogeneous film is less than 500 nm, 250 nm, 100 nm, 50 nm, 10 nm, 1 nm, or any value therebetween.

As illustrated in FIG. 1, the system 100 includes a deposition vessel 110. The deposition vessel 110 is integral to the operation of depositing thin films. The deposition vessel 110 has a top 110a and a bottom 110b. The deposition vessel 110 includes a substrate holder 112. The substrate holder 112 is, generally, positioned at the top 110a of the deposition vessel 110. The substrate holder 112 is configured to suspend the substrate 10 inside the deposition vessel 110 at an immersion depth 'D'. The substrate holder 112 maintains the position of the substrate 10 within the deposition vessel 110. The substrate holder 112 secures the substrate 10 firmly during the deposition process, facilitating uniform coverage by the coating material. This positioning ensures that the substrate 10 is submerged at the specific immersion depth 'D' for the consistent application of the thin film. The immersion depth 'D' is a predetermined variable that is set to enable the precise coating of the substrate 10. The configuration of the deposition vessel 110, inclusive of the substrate holder 112, is specifically designed to support the substrate 10 in such a manner that determines the deposition of thin film layers.

The system 100 also includes an outlet pipe 114. The outlet pipe 114 is a conduit for the movement of fluids out of the deposition vessel 110. The outlet pipe 114 has a drain valve 116 in line therewith. The drain valve 116 positioned to regulate the flow of liquid from the deposition vessel 110. The outlet pipe 114 is fluidly connected to the deposition vessel 110 at a first height 'H1' lower than the immersion depth 'D'. The arrangement ensures that the outlet pipe 114 is fluidly coupled to the deposition vessel 110 at the specific first height 'H1' determined to be lower than the immersion depth 'D' at which the substrate 10 is held by the substrate holder 112. This configuration allows for the controlled drainage of the coating material from the deposition vessel 110, through the outlet pipe 114, and for the accurate maintenance of the immersion depth 'D' during the coating process. The drain valve 116 further modulates the flow rate, thus aiding in the creation of a uniform thin film on the substrate 10.

The system 100 also includes an inlet pipe 118. The inlet pipe 118 is configured to supply a precursor liquid 120 in to fill the deposition vessel 110 with an amount of the precursor liquid 120. The inlet pipe 118 is structurally arranged to introduce the precursor liquid 120 into the deposition vessel 110. For this purpose, the inlet pipe 118 is fluidly connected to the deposition vessel 110 at a second height 'H2' greater than the outlet pipe 114. This configuration ensures a gravity-fed flow that enables the precursor liquid 120 to be supplied into the deposition vessel 110 efficiently. The role of the inlet pipe 118 is to transport the precursor liquid 120 from a source (not shown) to the interior of the deposition vessel 110. The deposition vessel 110 receives an amount of the precursor liquid 120 necessary for the deposition process through the inlet pipe 118. The height 'H2' at which the inlet pipe 118 connects to the deposition vessel 110 ensuring that the precursor liquid 120 can fill the deposition vessel 110 to the required level above the substrate 10, which is held at the immersion depth 'D' by the substrate holder 112. The inlet pipe may be at a height above the height of a top of the substrate 10. In some examples, the inlet pipe 118 may also be configured to control the flow of the precursor liquid 120, contributing to the precision and consistency of the thin film deposition on the substrate 10.

The system 100 further includes a collection vessel 122. The collection vessel 122 is incorporated to serve as the repository for the precursor liquid 120 after its use in the coating process. The collection vessel 122 has a top 122a and a bottom 122b. The collection vessel 122 is configured to receive and contain the precursor liquid 120 drained by gravity from the deposition vessel 110 at a controlled flow rate via the outlet pipe 114 and the drain valve 116. As shown, the top 122a of the collection vessel 122 is below the bottom 110b of the deposition vessel 110. This positioning ensure that the gravitational force can effectively transfer the precursor liquid 120 from the deposition vessel 110 to the collection vessel 122 without the need for additional pumping mechanisms.

Herein, the inlet pipe 118, the outlet pipe 114, the deposition vessel 110, and the collection vessel 122 are in fluid communication. The fluid communication between the inlet pipe 118, the outlet pipe 114, the deposition vessel 110, and the collection vessel 122 is integral to the operation of the system 100. Such arrangement provides a continuous pathway for the precursor liquid 120 to flow from the inlet pipe 118, through the process of coating the substrate 10 in the deposition vessel 110, and finally to the collection vessel 122 after the deposition phase via the outlet pipe 114. This arrangement maintains a consistent and controlled cycle of the precursor liquid 120 throughout the film deposition process within the system 100.

Further, as illustrated in FIG. 1, the system 100 includes a drying chamber 124. The drying chamber 124 is configured for the processing of the substrate 10 post-deposition. The drying chamber 124 is specifically configured to dry the precursor deposited on the substrate 10 and to remove the precursor from one of the first side or the second side of the substrate 10 to form a substrate having a single film. For this purpose, once the substrate 10, with the precursor layer, exits the deposition vessel 110 and has been drained of the excess precursor liquid 120, it is transferred to the drying chamber 124 where the deposited precursor is subjected to controlled drying conditions. The drying process within the drying chamber 124 ensures that the precursor layer adheres properly to the substrate 10, transitioning from a liquid state to a solid film. Additionally, the drying chamber 124 may facilitate the removal of the precursor from either the first side or the second side of the substrate 10, forming a substrate 10 that has a single film as may be required for achieving the specific functional characteristics required by the thin film coating.

The precursor can be selectively removed from one side of the substrate mechanically or chemically. For example, one side of the substrate can be exposed to a high velocity flow of air or solid particles suspended in air (or an inert gas). The gas flow and or impingement by particles serves to physically remove the precursor from the side of the substrate that is exposed to the gas/air flow. In another embodiment one side of the substrate is contacted with a scraper (e.g., a doctor blade) to mechanically remove the precursor. (Physico) chemical techniques such as dissolution, evaporation, sublimation, ablation and digestion may also be used. In yet another embodiment, one side of the film can be removed by a solvent. The solvent may be a low surface tension solvent, including, but not limited to, ethanol.

The system 100 also includes a decomposition furnace 126. The decomposition furnace 126 is tasked with the thermal treatment of the single film after the drying process. The decomposition furnace 126 is configured to decompose the single film at a decomposition temperature to form the thin film on the substrate 10. For this purpose, the decomposition furnace 126 operates at the specific decomposition temperature that is calibrated to break down the precursor material of the single film into the desired thin film on the substrate 10. The decomposition furnace 126 facilitates a chemical transformation of the dried precursor into a stable and functional thin film. By controlling the decomposition temperature within the decomposition furnace 126, the system 100 ensures that the single film undergoes a precise reaction, leading to the formation of the thin film with the intended material composition and properties.

In the illustrated example, the drying chamber 124 and the decomposition furnace 126 is shown to be located below the deposition vessel 110. Such vertical alignment may facilitate the efficient transition of the substrate 10 through the successive stages of the deposition process. The drying chamber 124 directly below the deposition vessel 110 allows for immediate start of the drying process once the substrate 10 is cleared of the precursor liquid 120. Subsequently, the substrate 10 can be transferred further down into the decomposition furnace 126. This sequential positioning supports a streamlined process flow, minimizing the need for extensive handling or transport of the substrate 10 between steps, thereby reducing process time. Further, such vertical alignment facilitates positioning the deposition vessel 110 at the required height to have the top 122a of the collection vessel 122 located below the bottom 110b of the deposition vessel 110, as required in the present configuration. However, it may be contemplated that the drying chamber 124 and the decomposition furnace 126 may be located separate from the deposition vessel 110 without departing from the spirit and the scope of the present disclosure.

Figure 2:
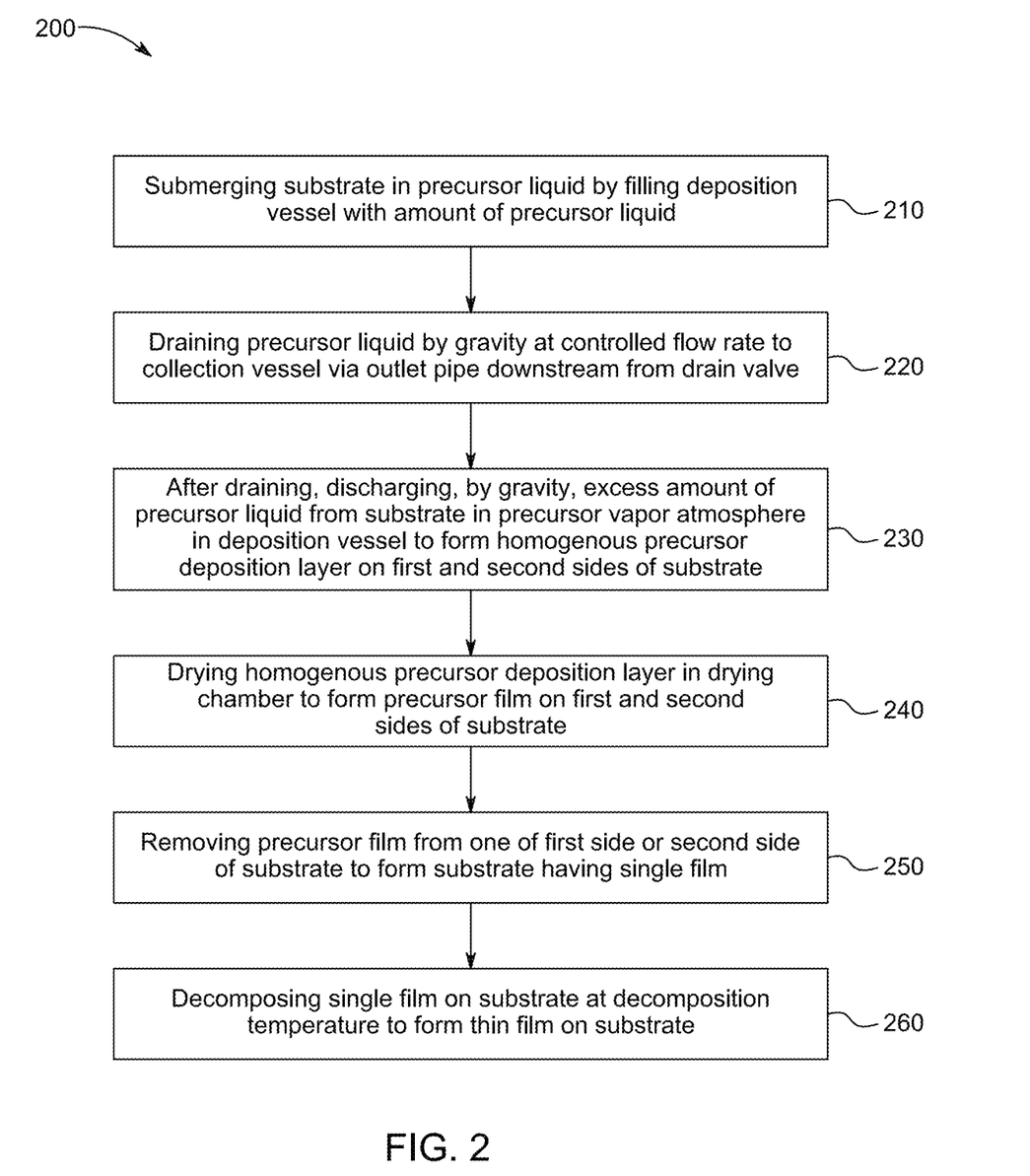
FIG. 2 is an exemplary flowchart of a method for depositing a thin film coating, according to certain embodiments.

Referring to FIG. 2, illustrated is a flowchart of a method (as represented by reference numeral 200) for depositing the thin film having the film thickness less than 10 µm on the substrate 10 having the first side and the second side. The method 200 for depositing the thin film utilizes the system 100 (as discussed in the preceding paragraphs) and encompasses a series of steps to achieve the thin film deposition on the substrate 10. These steps are only illustrative, and other alternatives can also be provided where one or more steps are added, one or more steps are removed, or one or more steps are provided in a different sequence without departing from the scope of the claims herein. Various embodiments and variants disclosed above, with respect to the aforementioned system 100 apply equally or with modifications to the method 200, as discussed in the proceeding paragraphs.

At step 210, the method 200 includes submerging the substrate 10 in the precursor liquid 120 by filling the deposition vessel 110 with an amount of the precursor liquid 120. As discussed, the deposition vessel 110 has the inlet pipe 118, the outlet pipe 114, the drain valve 116, and the substrate holder 112 configured to suspend the substrate 10 inside the deposition vessel 110 at the immersion depth 'D'. The outlet pipe 114 is fluidly connected to the deposition vessel 110 at the first height 'H1' lower than the immersion depth 'D' and the inlet pipe 118 is fluidly connected to the deposition vessel 110 at the second height 'H2' greater than the outlet pipe 114. The drain valve 116 is in line with the outlet pipe 114. The deposition vessel 110 is filled with the precursor liquid 120 through the inlet pipe 118.

To commence the submersion, the substrate 10 is positioned by the substrate holder 112 inside the deposition vessel 110 at the specified immersion depth 'D'. This immersion depth 'D' ensures that the substrate 10 is adequately covered by the precursor liquid 120 during the deposition process. The outlet pipe 114, which allows the precursor liquid 120 to exit the deposition vessel 110, is connected to the deposition vessel 110 at the first height 'H1' that is set lower than the immersion depth 'D' to facilitate the draining of the precursor liquid 120 after the substrate 10 has been coated. The higher connection point of the inlet pipe 118 is designed to enable the precursor liquid 120 to be poured into the deposition vessel 110 efficiently, ensuring the liquid reaches the necessary level for the submersion of the substrate 10. The inlet pipe 118 thus serves as the entry point for the precursor liquid 120, with the deposition vessel 110 being filled through this channel. The operation of the drain valve 116 in conjunction with the outlet pipe 114 is to manage the flow rate of the precursor liquid 120 exiting the deposition vessel 110, for maintaining the desired immersion depth 'D' and preventing the premature draining of the precursor liquid 120 during the deposition phase. Through this systematic process, the substrate 10 undergoes a controlled submersion within the precursor liquid 120 for the uniform deposition of the thin film.

At step 220, the method 200 includes draining the precursor liquid 120 by gravity at a controlled flow rate to the collection vessel 122 via the outlet pipe 114 downstream from the drain valve 116. Here, the controlled flow rate is achieved by adjusting the drain valve 116 situated on the outlet pipe 114. The drain valve 116 may modulate the volume and speed at which the precursor liquid 120 exits the deposition vessel 110, thereby ensuring that the draining process does not disrupt the deposition of the thin film on the substrate 10. The collection vessel 122 is configured to receive and contain the precursor liquid 120 from the deposition vessel 110. The collection vessel 122 is specifically designed to gather the precursor liquid 120 that has been used in the deposition process. The position of the collection vessel 122 relative to the deposition vessel 110 is such that the top 122a of the collection vessel 122 is below the outlet pipe 114 of the deposition vessel 110. This placement ensures that the precursor liquid 120 can be transported effectively from the deposition vessel 110 into the collection vessel 122 without the requirement for additional mechanical assistance. The inlet pipe, the outlet pipe, the deposition vessel, and the collection vessel are in fluid communication, to ensure the operation proceeds smoothly. This interconnectivity allows for the unobstructed flow of the precursor liquid 120, ensuring that once the substrate 10 has been sufficiently coated, the excess precursor liquid 120 can be drained away effectively, thereby concluding the submersion phase and preparing the substrate 10 for subsequent steps.

At step 230, the method 200 includes after the draining, discharging, by gravity, an excess amount of the precursor liquid 120 from the substrate 10, preferably in a precursor vapor atmosphere, in the deposition vessel 110 to form a homogenous precursor deposition layer on the first and second sides of the substrate 10. That is, following the draining process, the method 200 continues with the discharge of any excess droplets of the precursor liquid 120 from the substrate 10. This is executed within the confines of the deposition vessel 110, which provides the precursor vapor atmosphere for the formation of the homogenous precursor deposition layer on both the first and the second sides of the substrate 10. The discharge of the excess precursor liquid 120 is conducted by gravity, which allows the excess liquid to flow away from the substrate 10 naturally, without the aid of external forces. The presence of the precursor vapor atmosphere within the deposition vessel 110 during the discharge process aids in the stabilization of the homogenous precursor deposition layer. The precursor vapor atmosphere facilitates a uniform coating by preventing premature drying or uneven distribution of the precursor liquid 120, resulting in a uniformly coated substrate 10.

At step 240, the method 200 includes drying the homogenous precursor deposition layer in the drying chamber 124 to form a precursor film on the first and second sides of the substrate 10. In the drying chamber 124, the homogenous precursor deposition layer on the first and second sides of the substrate 10 is subjected to a drying process to remove any solvent or liquid constituents from the precursor layer, allowing it to solidify into the precursor film. The drying chamber 124 provides a controlled environment where temperature and airflow are regulated to facilitate the efficient drying of the precursor layer. This process ensures that the moisture or solvent present in the precursor layer is evaporated, leaving behind a solid film that adheres to the substrate 10. The result of this drying process is that the precursor film is uniformly deposited on both sides of the substrate 10.

At step 250, the method 200 includes removing the precursor film from one of the first side or the second side of the substrate 10 to form a substrate having a single film. That is, the process progresses by removing the precursor film from either the first side or the second side of the substrate 10, leaving only one side coated. This forms the substrate 10 that has the single film, as may be desired for certain applications where only one surface is intended to exhibit the functional properties of the thin film. It may be contemplated that the removal of the precursor film from one side of the substrate 10 may be achieved through techniques compatible with the integrity of the film and the substrate material. In an example, the precursor film may be removed from one side of the substrate 10 by a low surface tension solvent, such as ethanol. This selective removal provides the substrate 10 with the desired thin film characteristics on only one side, while the other side remains free of coating, either for functional reasons or for further processing.

At step 260, the method 200 includes decomposing the single film on the substrate 10 at a decomposition temperature to form the thin film on the substrate 10. That is, the substrate 10, having the single film, is subjected to a controlled thermal process in the decomposition furnace 126. In the decomposition furnace 126, the single film is heated to the specific decomposition temperature that is sufficiently high to induce a chemical transformation of the deposited material. The decomposition temperature is selected based on properties of the precursor material, ensuring that it decomposes to form the desired thin film without causing damage to the substrate 10. The heat treatment within the decomposition furnace 126 breaks down the precursor compounds, causing them to react and solidify into the thin film that exhibits the targeted physical and chemical characteristics required for its intended application. The controlled environment of the decomposition furnace 126 ensures that the entire surface of the single film on the substrate 10 undergoes uniform thermal processing, ensuring that the final product has homogeneous properties across the entire coated surface of the substrate 10.

In an embodiment, the substrate 10 comprises a glass, e.g., the substrate is a glass substrate. Herein, the decomposition temperature of the precursor film is less than a glass transition temperature of the substrate 10. That is, the decomposition temperature at which the single film is processed within the decomposition furnace 126 is selected to be below the glass transition temperature of the glass substrate 10. This is done to prevent any thermal damage or deformation to the glass substrate 10. The glass transition temperature is the point at which glass shifts from a hard and relatively brittle state into a molten or rubber-like state. Therefore, by setting the decomposition temperature of the precursor film below the glass transition temperature, the structural integrity of the glass substrate 10 is maintained during the transformation of the precursor film into the final thin film. Moreover, ensuring that the decomposition temperature remains below the glass transition temperature of the substrate 10 also prevents the introduction of unwanted stresses within the material, which could potentially lead to cracking or other forms of material failure.

In another embodiment, the substrate 10 comprises a metal. Herein, the decomposition temperature of the precursor film is less than a thermal oxidation temperature of the substrate 10. That is, the decomposition temperature at which the single film is processed within the decomposition furnace 126 is selected to be below the thermal oxidation temperature of the metal substrate 10. By ensuring that the decomposition temperature in the decomposition furnace 126 is set below the thermal oxidation temperature of the substrate 10, the method 200 prevents the oxidation that could compromise integrity of the metal substrate 10. Furthermore, the decomposition temperature below the thermal oxidation temperature safeguards the substrate 10 from undesirable changes, ensuring that the final thin film adheres properly and performs as intended without being compromised by surface oxidation.

In some embodiments of the present method 200, the immersing, draining, discharging, drying, removing and decomposing are repeated cyclically for two or more cycles to deposit a plurality of thin film layers and thereby increase an overall or cumulative thickness of the resulting film. That is, the method 200 incorporates a cyclical repetition of the key stages, including immersing the substrate 10 in the precursor liquid 120, draining the precursor liquid 120 by gravity to the collection vessel 122, discharging any excess amount of the precursor liquid 120 from the substrate 10, drying the homogenous precursor deposition layer in the drying chamber 124, and optionally removing the precursor film from one side of the substrate 10, and decomposing the single film on the substrate 10 at the decomposition temperature in the decomposition furnace 126. This cyclical process is designed to be conducted for two or more cycles, for depositing multiple layers of thin films on the substrate 10, which in turn increases the overall thickness of the thin film.

It may be understood that each cycle may add an additional layer of the precursor film, which is subsequently transformed into a thin film through the drying and decomposition processes. By conducting these processes in a controlled and repetitive manner, the method 200 ensures that each added layer adheres well to the previous one, maintaining uniformity and consistency across the entire coated surface of the substrate 10. This cyclic approach allows for tailoring of characteristics of the thin film, to achieve desired performance metrics through the accumulation of multiple thin film layers. Specifically, the repetition of these processes enhances the thickness of the final thin film to provide greater control over optical and physical properties of the final film.

In a non-limiting example, the plurality of thin film layers includes 6 layers. The inclusion of multiple layers, up to 16 in this particular instance, serves to enhance the functional attributes of the thin film, such as its durability, absorptivity, reflectivity, and other characteristics related to its performance in various applications. The process of cyclically repeating the key stages, i.e., immersing, draining, discharging, drying, removing, and decomposing, facilitates the sequential buildup of these layers, each contributing to the composite structure of the thin film. Particularly, in present examples, the plurality of thin film layers includes 6 layers. Such 6-layer structure provides flexibility and adaptability, allowing for adjustments based on specific requirements or desired outcomes. This layered approach is particularly advantageous in applications where the thickness and composition of the thin film play a role in the overall efficiency and effectiveness of the device in which the substrate 10 is incorporated.

In the present embodiments, the deposition vessel 110 has a first size. The first size of the deposition vessel 110 is tailored to accommodate the physical dimensions of the substrate 10. Specifically, the first size is determined based on the width and height of the substrate 10. The determination of the first size of the deposition vessel 110 is predicated upon the width and height of the substrate 10 to ensure that the substrate 10 can be fully submerged at the defined immersion depth 'D' for uniform coating. In a non-limiting example, the width of the substrate 10 is 150 mm-250 mm and the height of the substrate 10 is about 150 mm-250 mm. The correlation of the first size of the deposition vessel 110 with the dimensions of the substrate 10 facilitate the deposition process, ensuring there is sufficient volume within the deposition vessel 110 to hold the precursor liquid 120 and allow for adequate movement of the substrate 10 during the immersion and draining processes.

Further, the collection vessel 122 has a second size. The second size is determined based on the amount of the precursor liquid 120. The capacity, as defined by the second size, of the collection vessel 122 is designed to ensure that it can adequately contain all the precursor liquid 120 that is drained from the deposition vessel 110, accounting for the full amount that is initially introduced through the inlet pipe 118 to coat the substrate 10. This second size of the collection vessel 122 needs to be large enough to hold the precursor liquid 120 without spillage or overflow during the transfer process. By establishing the second size for the collection vessel 122 that correlates with the volume of precursor liquid 120, the system 100 maintains a closed-loop operation, allowing for the reuse or safe disposal of the precursor liquid 120 post-deposition.

In present implementations, the substrate 10 is preferably a solar collector and the thin film is a solar absorber. The solar collector is a component in solar energy systems designed to capture and convert solar radiation into usable energy. The thin film developed on this substrate 10 through the described processes functions as the solar absorber. This solar absorber plays a role in enhancing the efficiency of the solar collector by maximizing the absorption of solar radiation while minimizing reflective losses, thereby enhancing the solar energy conversion process. In present embodiments, the solar absorber comprises $Co_3O_4$/CuO. Cobalt oxide ($Co_3O_4$) is recognized for its excellent solar absorption capabilities due to its inherent physical and chemical properties, which allow for a high degree of solar radiation absorption across a wide spectrum. The addition of copper oxide (CuO) to the $Co_3O_4$ base further enhances the absorptive properties of the thin film, while also contributing to the reduction of surface reflectivity. This composite material composition achieves a balance between high absorptivity and low reflectivity, for maximizing the efficiency of the solar collector.

Further, in present implementations, a surface temperature of the second side of the substrate 10 having the plurality of thin films under a direct solar radiation is greater than 50° C. without a back insulation. That is, in the context of the present disclosure where the substrate 10 serves as a solar collector coated with a plurality of thin films, including $Co_3O_4$/CuO, a significant performance characteristic is observed concerning the thermal properties of the coated substrate 10. Specifically, the surface temperature of the second side of the substrate 10, which is opposite to the side bearing the solar absorber thin films, exhibits a notable increase when exposed to direct solar radiation. This increase in temperature is such that the surface temperature exceeds 50° C., even in the absence of any back insulation. The lack of back insulation means that the heat retention and temperature increase are solely attributable to the absorptive properties of the thin films and the inherent thermal characteristics of the substrate 10. This thermal response is indicative of the high efficiency of the formed thin film in converting solar radiation into heat.

Figure 3:
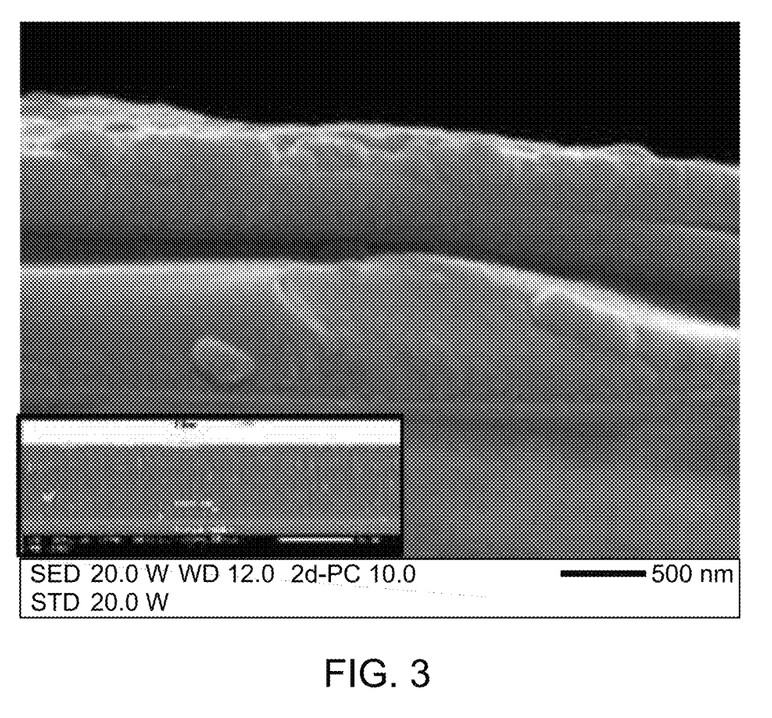
FIG. 3 is an exemplary cross-section depiction of a deposited thin film $Co_3O_4$ coating, according to certain embodiments.

FIG. 3 depicts an exemplary cross-section depiction of a deposited thin film $Co_3O_4$ coating, according to certain embodiments. The cross-section illustrates the structural formation of the $Co_3O_4$ coating, which is a result of the cyclical process of submerging, draining, discharging, drying, removing one layer of the precursor, and decomposing within the system 100. The cross-section visually demonstrates the uniformity and the homogeneity of the thin film, as well as the distinct boundaries that define the individual layers of $Co_3O_4$. The layered structure is indicative of the multiple cycles described in the method 200, where each cycle contributes to the cumulative thickness of the overall coating.

Figure 4A:
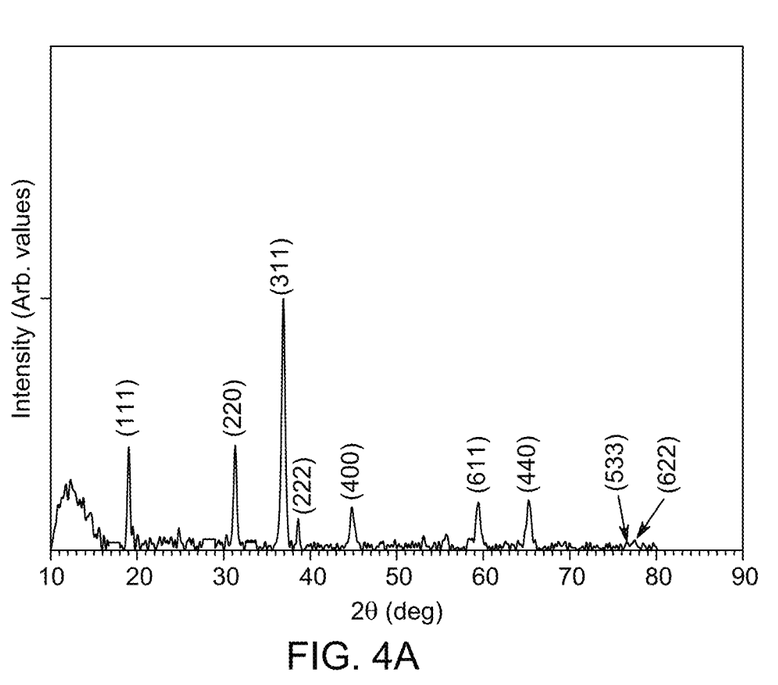
FIG. 4A is an exemplary graph of X-ray diffraction patterns of the deposited thin film $Co_3O_4$ coating, according to certain embodiments.
Figure 4B:
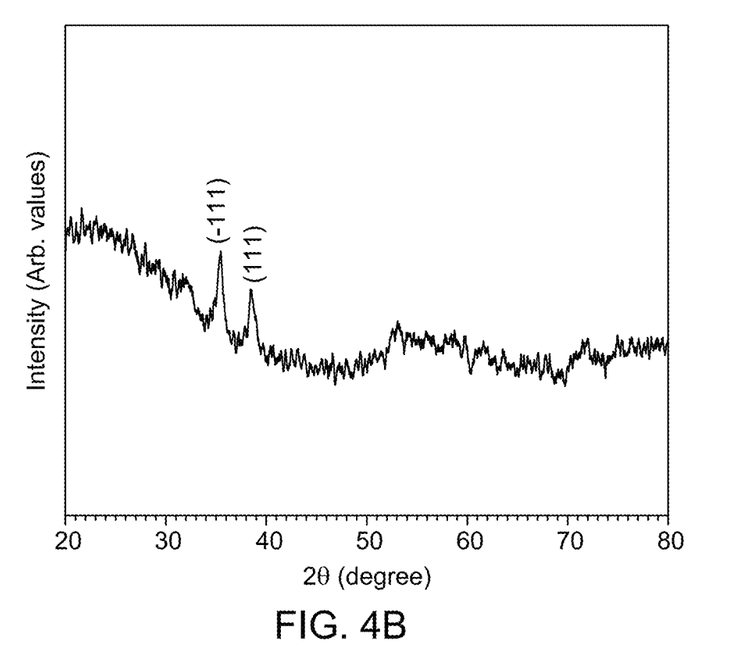
FIG. 4B is another exemplary graph of X-ray diffraction patterns of the deposited thin film $Co_3O_4$ coating, according to certain embodiments.

FIG. 4A provides an exemplary graph displaying X-ray diffraction (XRD) patterns of the deposited thin film $Co_3O_4$ coating. This graph represents structure of the $Co_3O_4$ material as evidenced by its distinct diffraction peaks. The intensity of the peaks, measured in arbitrary units (A.U.), is plotted against the 2θ angle in degrees, which is indicative of the Bragg's angles corresponding to the crystallographic planes within the $Co_3O_4$ structure. The presence and positioning of the peaks, such as those labeled (111), (220), (311), and others, confirm the polycrystalline nature of the $Co_3O_4$ coating. FIG. 4B presents another exemplary graph showcasing the X-ray diffraction (XRD) patterns of the deposited thin film $Co_3O_4$ coating. The XRD pattern in FIG. 4B confirms the crystallinity and phase composition of the $Co_3O_4$ coating. These graphs validate the successful deposition of the cobalt oxide thin film, as provided by the system 100 and the method 200 of the present disclosure.

Figure 5:
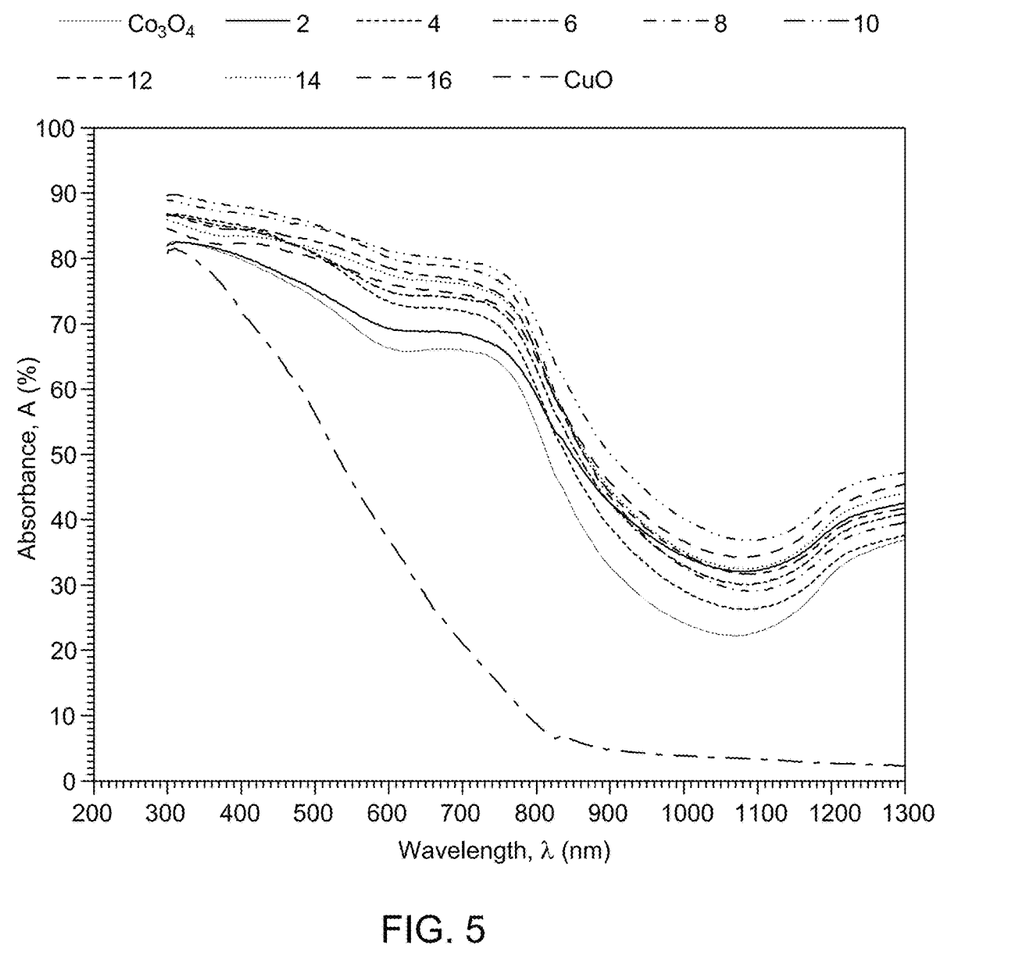
FIG. 5 is an exemplary graph of absorbance of $Co_3O_4/CuO$ multilayers as a function of a number of CuO layers, according to certain embodiments.

FIG. 5 illustrates an exemplary graphical representation of an absorbance percentage of $Co_3O_4$/CuO multilayer thin films across a range of wavelengths, denoted in nanometers (nm). The graph displays the variation in absorbance as a function of the number of CuO layers included in the $Co_3O_4$/CuO multilayer structure. The absorbance curves on the graph demonstrate how the addition of each CuO layer affects the light absorption across the spectrum. Each line on the graph correlates with a specific number of CuO layers, as indicated by the corresponding number in the legend. The absorbance rates are observed to change with the incorporation of additional CuO layers, highlighting the impact of the layered structure on the overall absorptive capacity of the thin film.

Figure 6:
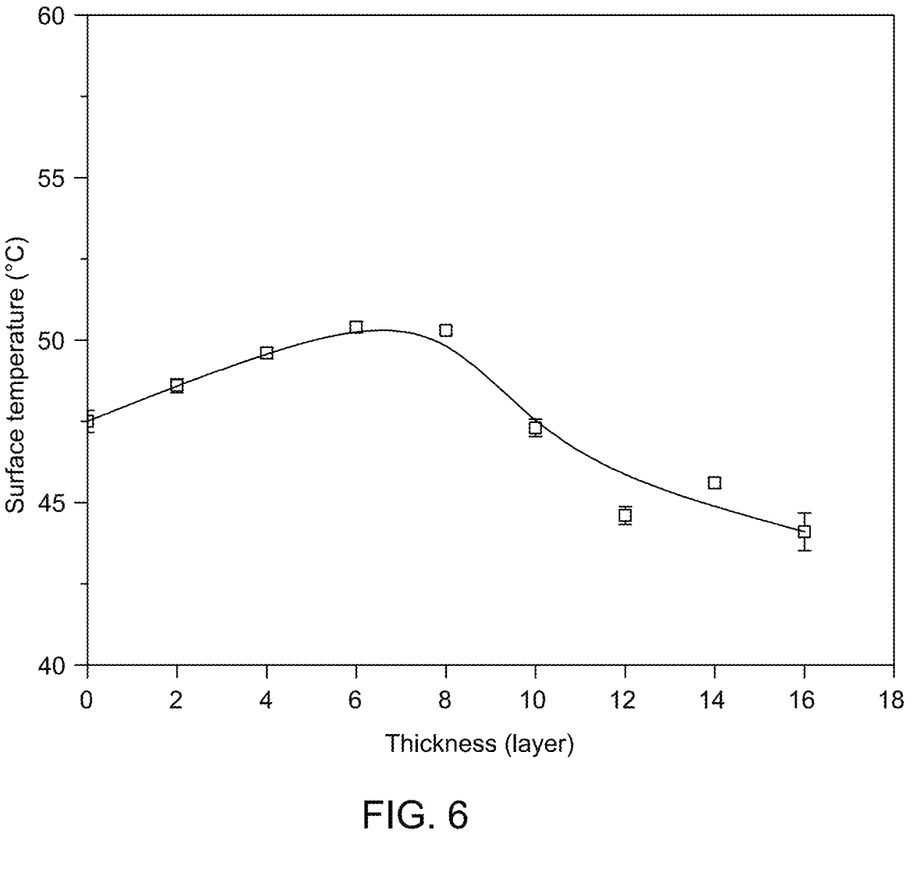
FIG. 6 is an exemplary graph of surface temperature measurements under direct solar radiation as a function of a number of CuO layers, according to certain embodiments.

FIG. 6 illustrates an exemplary graphical representation of a surface temperature measurements of substrates coated with varying numbers of CuO layers when subjected to direct solar radiation. The x-axis denotes the thickness of the coating in terms of the number of layers, while the y-axis represents the corresponding surface temperature in degrees Celsius (° C.). The data points on the plot are indicative of the thermal response of each multilayer thin film configuration under solar irradiation. The curve formed by connecting these data points shows a trend where the surface temperature initially increases with the addition of CuO layers, reaches a peak, and then gradually decreases as additional layers are added beyond a certain point. This provides insights into the relationship between the physical thickness of the CuO layers and the thermal properties of the coated substrate. An optimal number of layers for the desired thermal performance can be inferred from the plot which, as may be seen, is close to 6 layers.

The system 100 and the method 200 of the present disclosure represent an advancement in the field of solar energy harvesting by introducing a modified dip coating technique. The present invention enhances the implementation and localization of a low-cost deposition technology. The modifications introduced in the system 100 and the method 200 enable the deposition and coating of thin metal oxide films that exhibit high adherence and quality, surpassing the capabilities of traditional dip coating techniques. The deposited films possess a longer lifetime and superior quality, providing a considerable improvement over the existing dip coating techniques. Further, the low-cost deposition technique employed by the system 100 and the method 200 provide scalability, enabling the uniform coating of both wide-area substrates and smaller samples.

The ability to deposit multiple layers of thin films, as facilitated by the system 100 and the method 200, addresses the challenges related to optical absorption and high reflectance. The application of the antireflecting coating, particularly with $Co_3O_4$/CuO, greatly reduces the reflective losses over a broad solar spectrum, thereby enhancing the efficiency of solar radiation absorption. The use of the multilayered $Co_3O_4$/CuO coating has demonstrated an increase in surface temperature of the substrate 10 by approximately 10° C. above that of standard solar absorbers. This temperature difference has been observed without use of the back insulation, which makes the substrate 10 suitable for optical transparent glass windows. This also means that the substrate 10 could be potentially enhanced with the incorporation of additional insulating layer or protective layers.

Numerous modifications and variations of the present disclosure are possible in light of the above teachings. It is therefore to be understood that within the scope of the appended claims, the invention may be practiced otherwise than as specifically described herein.

The invention claimed is:

1. A method for depositing a plurality of thin films, each having a film thickness less than 10 µm, on a substrate having a first side and a second side, the method comprising:
    immersing the substrate in a precursor liquid by filling a deposition vessel with an amount of the precursor liquid, wherein the deposition vessel has an inlet pipe, an outlet pipe, a drain valve, and a substrate holder configured to suspend the substrate inside the deposition vessel at an immersion depth, wherein the outlet pipe is fluidly connected to the deposition vessel at a first height lower than the immersion depth and the inlet pipe is fluidly connected to the deposition vessel at a second height greater than the outlet pipe, wherein the drain valve is in line with the outlet pipe, and wherein the deposition vessel is filled with the precursor liquid through the inlet pipe;
    draining the precursor liquid by gravity at a controlled flow rate to a collection vessel via the outlet pipe downstream from the drain valve, wherein the collection vessel is configured to receive and contain the precursor liquid from the deposition vessel, wherein a top of the collection vessel is below the outlet pipe of the deposition vessel and wherein the inlet pipe, the outlet pipe, the deposition vessel, and the collection vessel are in fluid communication;
    after the draining, discharging, by gravity, an excess amount of the precursor liquid from the substrate in a precursor vapor atmosphere in the deposition vessel to form a homogenous precursor deposition layer on the first and second sides of the substrate;
    drying the homogenous precursor deposition layer in a drying chamber to form a precursor film on the first and second sides of the substrate;
    removing the precursor film from one of the first side or the second side of the substrate to form a substrate having a single film; and
    decomposing the single film on the substrate at a decomposition temperature in a decomposition chamber to form a single thin film of $Co_3O_4$ on the substrate;
    repeating the immersing, draining, discharging, drying, removing and decomposing cyclically 8 to 12 cycles to deposit a plurality of further thin film layers upon the single thin film of the $Co_3O_4$,
    wherein the single thin film of the $Co_3O_4$ is a solar absorber,
    wherein the further thin film layers are CuO, and
    wherein a thickness difference between a thickest part and a thinnest part of each film is less than 500 nm.

2. The method of claim 1, wherein the substrate is a solar collector.

3. The method of claim 1, wherein, in operation, a surface temperature of the second side of the substrate having the plurality of the further thin films under a direct solar radiation is greater than 50° C. without a back insulation.

4. The method of claim 1, wherein a width of the substrate is 150 to 250 mm and a height of the substrate is 150 to 250 mm.

5. The method of claim 1, wherein the substrate is a glass, and
    wherein the decomposition temperature of the precursor film is less than a glass transition temperature of the substrate.

6. The method of claim 1, wherein the substrate is a metal, and
    wherein the decomposition temperature of the precursor film is less than a thermal oxidation temperature of the substrate.

7. The method of claim 1, further comprising:
    positioning the substrate holder on a top of the deposition vessel and securing the substrate to thereby uniformly cover the precursor liquid onto the substrate.

8. The method of claim 1, comprising 8 of the further thin film layers of CuO.

9. The method of claim 1, comprising 10 of the further thin film layers of CuO.

10. The method of claim 1, comprising 12 of the further thin film layers of CuO.

\* \* \* \* \*